No. 805,037. PATENTED NOV. 21, 1905.
E. A. STULZ.
BOLT ANCHOR.
APPLICATION FILED APR. 14, 1905.
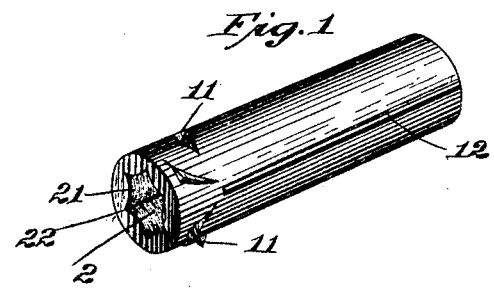
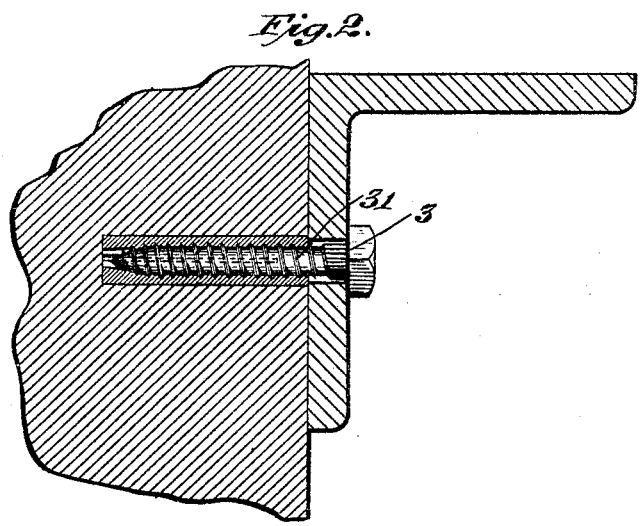
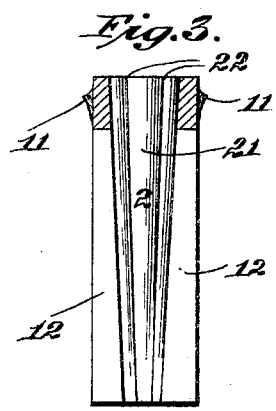
Attest:
C. Mitchell
A. L. O'Brien
Inventor:
Edward Anthony Stulz
by Dickerson, Brown, Raegener & Binney
Attys.

UNITED STATES PATENT OFFICE.

EDWARD ANTHONY STULZ, OF AVENEL, NEW JERSEY.

BOLT-ANCHOR.

No. 805,037. Specification of Letters Patent. Patented Nov. 21, 1905.

Application filed April 14, 1905. Serial No. 255,532.

*To all whom it may concern:*

Be it known that I, EDWARD ANTHONY STULZ, a citizen of the United States, and a resident of Avenel, New Jersey, have invented certain new and useful Improvements in Bolt-Anchors, of which the following is a specification.

My invention relates to bolt-anchors such as are used to secure a screw or bolt in stonework or in other material in which the thread of the screw would not engage or would be seriously defaced.

It consists in providing a socket of soft metal or like material adapted to fill a hole drilled in the stone or the like for the purpose and having a longitudinal bore of a peculiar contour for the reception of the screw.

It further consists of details of construction, as will hereinafter appear.

In the drawings, Figure 1 is a perspective view of my bolt-anchor. Fig. 2 shows the same with the bolt therein and as applied to supporting a bracket against a stone wall. Fig. 3 is a longitudinal section of the anchor shown in Fig. 1.

In the drawings, 1 designates a bolt-anchor shown as having a substantially cylindric outer surface provided with a plurality of small projections 11. The anchor is shown as having a longitudinal slot 12 extending from its rear nearly to its front end. The bore 2 of the anchor is of polygonal form, each side 21 of the polygon being in the form of a reëntrant curve, so that sharp angles 22 are formed at the junction of these sides. As shown, the bore 2 tapers from the front to the rear end of the anchor 1, so that the curves of the sides 21 gradually diminish from front to rear. It is plain, therefore, that when in the claims I speak of "sides having reëntrant curves" I include those which have a pronouncedly reëntrant curve for a considerable and useful portion of the length of the anchor. Similar bolt-anchors made of lead or other soft material have been long used; but it is found to be a great advantage to produce an anchor with the polygonal sides having reëntrant curves, as shown, in that the thread 31 of the bolt 3 secures a very strong engagement with these curved sides as the bolt is driven home, and the angles 22 are adapted to receive any chip of metal which may be cut off the surfaces of the sides 21 during the screwing-in operation.

It is evident that the exterior contour of the bolt, shown as cylindrical and provided with projecting portions adapted to embed themselves in the interstices of the stone, is immaterial to my invention and that an anchor of any desired exterior contour may be used as desired.

Without enumerating equivalents or specifying materials, what I claim is—

1. A bolt-anchor having a tapered longitudinal bore, the cross-section of which for a substantial portion of its length is that of a polygon with reëntrant curved sides.

2. A bolt-anchor having a longitudinal bore, the cross-section of which is that of a polygon with reëntrant curved sides, in combination with an inserted threaded bolt, the thread diameter of which is greater than the least, and less than the greatest diameter of the anchor-bore.

In testimony whereof I have signed this specification in the presence of two subscribing witnesses.

EDWARD ANTHONY STULZ.

Witnesses:
J. C. LAING,
C. P. BOYD.